INVENTOR
GORDON WELTON THOMPSON

BY Claude L. Beaudoin
ATTORNEY

United States Patent Office 3,391,912
Patented July 9, 1968

3,391,912
**FLAME TREATING APPARATUS
AND METHOD**
Gordon Welton Thompson, Clinton, Iowa, assignor to
E. I. du Pont de Nemours and Company, Wilmington,
Del., a corporation of Delaware
Continuation-in-part of application Ser. No. 491,144,
Sept. 29, 1965. This application Jan. 19, 1967, Ser.
No. 632,841
6 Claims. (Cl. 263—3)

ABSTRACT OF THE DISCLOSURE

The present invention relates to the treatment of plastic materials and, more particularly, is directed to a method and an improved burner device for flame treating organic thermoplastic polymeric material. Polypropylene may be flame treated by continuously passing polypropylene film at a distance of about 100 mils from the slot orifice of an elongated burner from which issues a continuous flame which impinges upon the surface of the polypropylene.

---

The present application is a continuation-in-part application of application Ser. No. 491,144 filed Sept. 29, 1965, now abandoned.

*Background of the invention*

The present invention relates to the treatment of plastic materials and, more particularly, is directed to a method and an improved burner device for flame treating organic thermoplastic polymeric material.

Flame treatment of organic thermoplastic polymeric structures such as, for example, subjecting the surface of polyethylene film to the action of an open flame emanating from a gas burner, is a now well-known method for rendering the surfaces of such structures adherable to a wide variety of materials as, for example, printing inks, adhesives, and coating compositions. For example, each of U.S. Patents 2,633,921, 2,683,894, 2,704,382, and 2,746,084, discloses a method and suitable apparatus for rendering the surface of polyethylene adherable to printing inks by directing a burning flame against the surface of the polyethylene plastic material either before or after printing thereon and under prescribed conditions of temperature of the burning flame and of the polyethylene material. One of many problems encountered in the use of flame treatment of film or like structures is that of securing or achieving a stable gaseous flame which will provide uniform treatment across the entire width of the particular film, sheet stock or other plastic structure being treated. The size of the burner discharge opening as well as distance of the burner discharge opening from the film being treated must be precisely adjusted in order to provide the proper degree and uniformity of treatment. However, because of the large amount of heat given off by the flame during the treating operation, it is found that structural members of the apparatus, especially the burner device itself and those in close proximity thereto or to the flame thereof undergo dimensional changes as the result of heat transferred either by conduction through the structural members or by convection and radiation from the burning flame, or both; e.g., the structural members supporting the burner device with respect to the rotating drum that supports the plastic film undergo changes in dimension. The net result is that adjustments carefully made initially with respect to the discharge opening of the burner as well as the distance of the burner discharge opening from the plastic film are not maintained and uniformity of treatment is not obtained. Accordingly, it is the principal object of the present invention to provide a method and an improved device and apparatus for the flame treatment of organic thermoplastic polymeric material that are free of the above-mentioned drawbacks.

According to the present invention, there is provided a method of manufacture for treating shaped structures of organic thermoplastic polymeric material which comprises circulating a fluid medium through internal passages of an elongated burner whereby to raise the temperature of said burner to about 40° C. and thereafter igniting said burner and directing the flame thereof against the continuously travelling surface of said shaped structure of organic thermoplastic material spaced substantially uniformly from said burner whereby to maintain a substantially uniformly from said burner whereby to maintain a substantially uniform spacing between said shaped structure and said burner during the treatment for rendering the surface of said shaped structure adherable.

According to the present invention, there is further provided an article of manufacture comprising a burner adapted for connection to a supply of combustible gaseous fuel, said burner having a body consisting of an upper portion integral with or secured to a lower portion, an internal chamber in said body for receiving said combustible gaseous fuel, an orifice passage communicating between said internal chamber and orifice lips at the terminal point of the orifice passage for passage of said combustible gaseous fuel therethrough, and internal passages in said upper body portion in cooperative registry with internal passages in said lower body portion adapted for passage of a fluid medium therethrough.

The nature and advantages of the invention will be more clearly understood by the following description, the appended claims, and the several views illustrated in the accompanying drawings wherein like reference characters refer to the same parts throughout the several views and in which:

Figure 1:
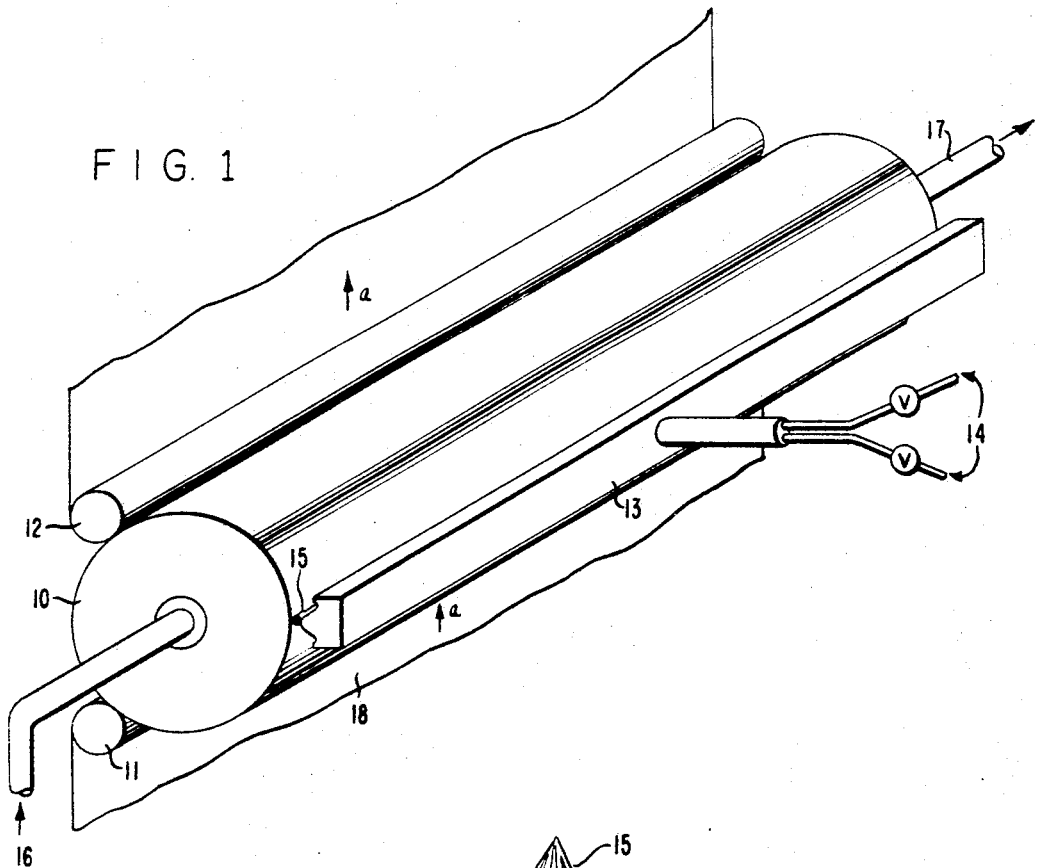
FIGURE 1 is a perspective view of the general arrangement of the improved device and apparatus of the invention.

The burner device and flame treating apparatus herein disclosed in illustration of the invention includes a drum or roll 10 axially rotatably driven by suitable means not shown, satellite rotatable rollers 11 and 12, located adjacent to and aligned coaxially with drum 10 and a stationary gaseous burner 13 also located adjacent to and preferably aligned coaxially with drum 10. Burner 13 is provided with suitable inlets 14 for gaseous fuel which is distributed through the entire width of the burner and burned to provide an endless flame 15. Drum or roller 10 is provided with inlet 16 and outlet 17 for circulating a fluid medium therethrough for regulating the surface temperature of the drum. In operation, polymeric film material 18 is advanced in the direction of the arrow *a* at a controlled speed and passes, in succession, around roller 11, drum 10, and roller 12. The flame 15 is directed against the surface of the polymeric film 18 as it passes around the drum 10.

Figure 2:
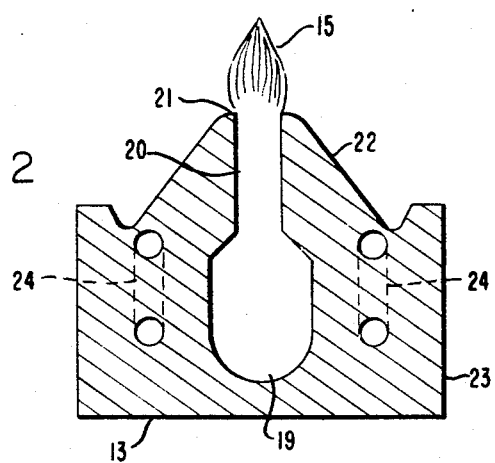
FIGURE 2 is a cross-sectional view of the burner device employed in the arrangement shown in FIGURE 1.

The burner device of the invention is shown more specifically in FIGURE 2 wherein the burner 13 is shown as having an upper portion 22 integral with, or if separate secured to, a lower portion 23 and an internal passage or chamber 19 extending the entire length of the burner for distributing combustible gaseous fuel therethrough. The combustible gaseous fuel passes from internal chamber 19 through orifice passage 20 and is adapted to be burned at or near orifice lips 21 to provide flame 15. The burner device 13 is further characterized by internal passages 24 interconnecting upper portion 22 and lower portion 23 for circulating therethrough a suitable fluid medium, preferably water, for cooling the burner device when it is in operation.

In operation, the burner device is maintained at a temperature between about 38° C. and 45° C., preferably 40° C. and the burner device is positioned so as to provide a gap or spacing of about 100 mils between the burner orifice lips or discharge opening and the plastic film surface being treated.

The remarkable and unexpected dimensional stability of the burner device and apparatus of the present invention is dramatically illustrated by a comparison thereof with a similar device identical therewith in all respects except that no cooling of the device takes place. In the comparison, the burner orifice lips were initially positioned at 100 mils from the plastic film surface at ambient conditions of temperature, e.g., 20° C. In the first instance, utilizing no cooling of the burner device, the burner orifice lips in operation of the device deflect about 12 mils in the direction of the plastic film, resulting in an average gap or spacing between the burner orifice lips and the plastic film of about 88 mils, instead of the original 100 mils. In the second instance, when water is first circulated through the internal coolant passages of the device before operation thereof to raise the temperature thereof to 40° C., the burner orifice lips deflect about 10 mils in the direction of the plastic film. However, when the burner device is rendered operative, i.e., the flame is "turned-on," so to speak, the deflection of the burner orifice lips is surprisingly and totally unexpectedly reduced to only 2 mils, resulting in an average gap or spacing between the burner orifice lips and the plastic film of about 98 mils.

The advantage of the more stable arrangement of the burner device with respect to maintaining a fixed burner opening as well as the ability of maintaining the gap or spacing between the burner and the plastic film being treated is self-evident. For instance, with the new arrangement not only is the gap or spacing more easily maintained, but the dimension of the discharge opening of the burner remains more constant so that the amount of gaseous mixture being supplied to the burner as well as the distance of the burner opening from the film can be held within very close tolerances, all of which results in the more uniform treatment of the plastic film. There appears to be little advantage in operating the temperature regulating fluid at temperatures higher than about 45° C. although no especially adverse effects would seem to be observable as the temperature is permitted to increase to a somewhat higher level.

What is claimed is:

1. A method of manufacture for treating shaped structures of organic thermoplastic polymeric material which comprises circulating a fluid medium through internal passages of an elongated burner whereby to raise the temperature of said burner to about 40° C. and thereafter igniting said burner and directing the flame thereof against the continuously travelling surface of said shaped structure of organic thermoplastic material spaced substantially uniformly from said burner whereby to maintain a substantially uniform spacing between said shaped structure and said burner during the treatment for rendering the surface of said shaped structure adherable.

2. The method of claim 1 wherein said shaped structure is a film structure of polypropylene.

3. In the method of flame treating plastic films wherein a flame from a burner having an elongated body consisting of an upper portion integral with or secured to a lower portion and internal passages in said upper body portion in cooperative registry with internal passages in said lower body portion, is impinged on the exposed surface of a plastic film, the improvement comprising circulating a fluid medium in said internal passages in said burner for maintaining the temperature of said burner between about 38° C. and 45° C.

4. An article of manufacture comprising a burner adapted for connection to a supply of combustible gaseous fuel, said burner having a body consisting of an upper portion integral with or secured to a lower portion, an internal chamber in said body for receiving said combustible gaseous fuel, an orifice passage communicating between said internal chamber and orifice lips at the terminal point of the orifice passage for passage of said combustible gaseous fuel therethrough, and internal passages in said upper body portion in cooperative registry with internal passages in said lower body portion adapted for passage of a fluid medium therethrough.

5. In an apparatus for flame treating the surfaces of plastic films comprising a rotatably mounted roller adapted to convey said film and to contain a fluid medium for regulating the surface temperature of the roller; means for impinging a flame on the exposed surface of said conveyed film comprising a burner adapted for communication with a supply of combustible gaseous fuel and having a narrow elongated orifice passage terminating in a fuel discharge opening, the improvement wherein said burner is characterized by an elongated body consisting of an upper portion integral with or secured to a lower portion, an internal chamber in said body in communication with said elongated orifice passage for receiving said combustible gaseous fuel, and internal passages in said upper body portion in cooperative registry with internal passages in said lower body portion extending substantially parallel to said internal chamber and said elongated orifice passage adapted for passage of a fluid medium therethrough.

6. In an apparatus for flame treating the surfaces of plastic films comprising a rotatably mounted roll adapted to convey said film and to contain a fluid medium for regulating the surface temperature of the roller; means for impinging a flame on the exposed surface of said conveyed film comprising a burner adapted for communication with a supply of combustible gaseous fuel and having a narrow elongated orifice passage terminating in a discharge opening, the improvement comprising a burner having a body consisting of an upper portion secured to a lower portion and internal passages in said upper body portion in cooperative registry with internal passages in said lower body portion adapted for passage of a fluid medium therethrough.

References Cited
UNITED STATES PATENTS

| | | | |
|---|---|---|---|
| 1,514,815 | 11/1924 | Anderson | 158—27.41 |
| 2,203,087 | 6/1940 | Hanson | 263—3 X |
| 2,268,987 | 1/1942 | Hess et al. | 266—3 X |
| 2,536,609 | 1/1951 | Kemp et al. | 158—105 |
| 2,591,283 | 4/1952 | Nesbitt et al. | 158—99 |
| 2,719,581 | 10/1953 | Greathead | 158—116 |
| 3,142,331 | 7/1964 | Dierks | 239—552 X |

JOHN J. CAMBY, *Acting Primary Examiner.*